United States Patent
Rosenfellner

(10) Patent No.: US 6,293,992 B1
(45) Date of Patent: Sep. 25, 2001

(54) METHOD AND DEVICE FOR PROCESSING REDUCING GAS FOR REDUCING ORES

(75) Inventor: Gerald Rosenfellner, St. Peter/AU (AT)

(73) Assignee: Voest-Alpine Industrieanlagenbau GmbH (AT)

( * ) Notice: Subject to any disclaimer, the term of this patent is extended or adjusted under 35 U.S.C. 154(b) by 0 days.

(21) Appl. No.: 09/380,358

(22) PCT Filed: Mar. 11, 1998

(86) PCT No.: PCT/AT98/00064

§ 371 Date: Aug. 30, 1999

§ 102(e) Date: Aug. 30, 1999

(87) PCT Pub. No.: WO98/40521

PCT Pub. Date: Sep. 17, 1998

(30) Foreign Application Priority Data

Mar. 12, 1997 (AT) .................................................. 424/97

(51) Int. Cl.[7] .................................................. C22B 9/05
(52) U.S. Cl. .................................. 75/505; 75/493; 75/496
(58) Field of Search .............................. 75/505, 493, 494, 75/496; 266/155, 156

(56) References Cited

U.S. PATENT DOCUMENTS

| | | | |
|---|---|---|---|
| 3,844,766 | * 10/1974 | Beggs | 75/490 |
| 4,175,951 | 11/1979 | Rubio | 75/91 |
| 4,235,624 | * 11/1980 | Wagener et al. | 75/496 |
| 4,331,470 | * 5/1982 | Scarlett et al. | 75/493 |
| 4,435,157 | 3/1984 | Bühler et al. | 432/30 |
| 4,513,814 | 4/1985 | Wallstein | 165/134 |
| 4,537,626 | 8/1985 | Pfeiffer et al. | 75/35 |

FOREIGN PATENT DOCUMENTS

| | | |
|---|---|---|
| 2413558 | 10/1974 | (DE) . |
| 3142485 | 5/1983 | (DE) . |
| 3213204 | 10/1983 | (DE) . |
| 3333057 | 4/1985 | (DE) . |
| 4030093 | 3/1992 | (DE) . |
| 0041861 | 12/1981 | (EP) . |
| 0056603 | 7/1982 | (EP) . |
| 0633445 | 1/1995 | (EP) . |
| 2188066 | 9/1987 | (GB) . |
| 56093805 | 10/1981 | (JP) . |
| 94/10512 | 5/1994 | (WO) . |

OTHER PUBLICATIONS

*Patent Abstracts of Japan* vol. 005, No. 164 (C–076), Oct. 21, 1981 & JP 56 093805 A (Chiyoda Chem Eng & Constr Co Ltd: Others: 01), Jul. 29, 1981, see abstract.

* cited by examiner

*Primary Examiner*—Roy King
*Assistant Examiner*—Tima McGuthry-Banks
(74) *Attorney, Agent, or Firm*—Ostrolenk, Faber, Gerb & Soffen, LLP

(57) ABSTRACT

A process to optimize the reduction process with a given quality of ore. The reduction gas 7 is analyzed by means of gas sensor 1 and is separated into two partial flows. The throughput of the partial flow which is oxidized is regulated by a regulation valve 3 and is then sent to the burner 4 where it is oxidized. The other partial flow of the reduction gas is regulated by a regulation valve 2 according to the required amount of gas in the shaft and is thereafter brought to the required temperature in the heat exchanger 11 and mixed with the oxidized partial flow of the reduction gas. The gas components are determined by a gas sensor 13 and, when necessary, a gas delivery 14 is adjusted according to mathematical formulations. This makes it possible to run the reduction process in the direction of its stoichiomeric optimum using a given quality of ore. A further advantage lies in the fact that the reduction gas can be heated to a desired temperature while maintaining a very low oxidant portion in order that the gas analysis can be adjusted in wide ranges.

4 Claims, 1 Drawing Sheet

METHOD AND DEVICE FOR PROCESSING REDUCING GAS FOR REDUCING ORES

BACKGROUND OF THE INVENTION

This is a national stage of Application No. PCT/AT98/00064, filed Mar. 11, 1998.

1. Field of the Invention

The invention relates to a process for the reduction of ores, especially iron ores, to iron. In this process, the ore at a high temperature is brought into contact with a reduction agent which is preferably a carbon-containing gas.

2. Brief Description of the Related Art

DE 40 30 093 A1 describes a process for the direct reduction of iron ore in a shaft furnace with a reduction gas containing hydrogen and carbon monoxide. Top gas extracted from the shaft furnace is subsequently mixed with a methane-rich gas, and the gas mixture is then converted to reduction gas in a reformer.

U.S. Pat. No. 4,537,626 reveals a process in which the reduction gases exiting a steel converter are heated in a heat exchanger with a carbon-containing material and are subsequently introduced into a metallurgical reduction reactor. This method has the particular disadvantage of not being able to influence the quality of the reduction gas after it exits the converter. An even reduction process in the reduction reactor is not ensured and its product quality is subject to extreme fluctuations as a consequence.

U.S. Pat. No. 4,175,951 reveals a process for the production of a hot reduction gas stream in which a preheated reduction gas stream is mixed with the combustion products of a gaseous hydrocarbon material. Because an external source of fuel must be available for preheating the reduction gas as well as for the heating of the reduction gas to the desired final temperature, this process is judged as disadvantageous due to the continual operational costs.

EP-A 004 1861 describes a heated heat exchanger for heating gases with solid fuels, though in this process the combustion gases are mixed with the gases to be heated. However it is a disadvantage in this process that the gases are mixed.

EP-A 0 663 445 describes a gas-gas, tube-bundle heat exchanger for high temperatures. In this heat exchanger, the tube bundle can be replaced after removing the cap. It is also a disadvantage that the gases are mixed in this system.

WO 94/10512 describes a gas heater in which special emphasis is placed on maintaining the cleanness of the gas. Heating the gases is accomplished by means of a heated perforated impingement plate which is designed to be regulated by temperature.

EP-A 0 056 603 describes a Cowper for blast furnace processes. The Cowper is lined with a ceramic refractory which is characterized by high chemical and thermal strength. This system is disadvantageous insofar as the Cowper possesses a high thermal inertia due to its construction.

DE-C 3 213 204 depicts heat exchangers, preferably for cooling flue gas, with heads and high-temperature-resistant pipes of which the replacement pipes are arranged in a longitudinal direction. The support head is of concrete, and the pipes are positioned in a head which is longitudinally moveable. The heat exchanger is operated in countercurrent flow, and the guide head is moveable to account for the heat expansion of the pipes due to the changes in temperature. The construction is very sturdy; however because the materials contain iron, they lend themselves to corrosion and abrasion.

DE-C 3 142 485 depicts a glass-tube heat exchanger for cooling aggressive and hot flue gases. In this system, the glass tube bundle is positioned perpendicular to the flow of the gas which is fed to the tubes from lateral slits. A cross-section of the entry slits are variable, however it is rather difficult to employ this system in heating the mentioned gases.

The DE-C 3 333 057 has also been recommended as a heat exchanger consisting of glass tubes onto which gases are blown from the side and the housing of which is jacketed. The heating elements are built into the hollow space within the housing wall and minimize the condensation of highly volatile components. This system is not, however, conceived for the heating of gases in the required areas.

In one of the current processes, the reduction gas is brought to the required reaction temperature before it is fed into the reduction container. Currently, this occurs by means of metallic heat exchangers, some of which are available as throw-away heat exchangers. In cases of high CO content, the conventional designs have the problem of carbide build-up in the material due to the dissociation of the CO. These carbides lead to decomposition of the material as soon as the saturation point is surpassed. Even in the event of reduction gases which contain high concentrations of $H_2$, there is a decomposition of the material as well. In the conventional designs of the various systems, this problem is solved by a partial combustion of the reduction gas. This leads to compromises in the quality of the reduction gas.

This means that the heat exchangers made of iron materials make it nearly impossible to supersede certain temperature zones and to fall below oxidation potentials because the attrition of the heat exchanger would not comply with industrial tolerances. Furthermore, the current heat exchangers represent a safety problem.

SUMMARY OF THE INVENTION

The purpose of the invention is therefore to create a process which avoids the problems of the above systems and which optimizes the reduction process when given a specific quality of ore.

The problem is solved by separating and oxidizing a first partial flow of the reduction gas before bringing the ore into contact with the reduction gas, adjusting the temperature of the second partial flow to a desired level, combining both partial flows and, optionally, adding an additional gas to the combined partial flows prior to bringing the reduction gas into contact with the ore.

This invention makes it possible for the first time to run the reduction process in the direction of its stoichiometric optimum using a given quality of ore. One deciding criterion is the material technology of the heat exchanger because the surface's catalytic influence can have a negative effect. If the correct material is chosen, the production capacity can be increased in extreme cases up to 30%. A further advantage lies in the fact that the reduction gas can be heated to a desired temperature while maintaining a very low oxidant portion in order that the gas analysis can be adjusted in wide ranges.

One of the features of the invention is that the throughput of the partial flow and of the additional gas is controlled in a range of 0–100% respectively. This range allows an optimized reaction to the total variance of the employed gas qualities.

According to another feature, the invention is characterized by a reduction container, preferably a shaft reduction furnace having a feed line for providing reduction gas for the reduction furnace, the feed line having a first gas sensor, a regulation valve and a heat exchanger for heating the reduction gas, the heat exchanger being made of a non-iron base material. A by-pass line connecting the feed line upstream of the first gas sensor with the feed line downstream of the heat exchanger has a regulation valve and a burner for oxidizing a partial flow of the reduction gas. The feed line for reduction gas has downstream of its insertion point of the by-pass line a second gas sensor and, downstream of the second gas sensor a further feed line for the addition of an additional gas. Optionally, the feed line for reduction gas has a third gas sensor which may be located either upstream or downstream of the further feed line. This constellation allows optimized regulation of the process by means of on-line monitoring.

Another feature of the invention is the glass construction of those parts of the heat exchanger which come into contact with the reduction gas. Designing the heat exchanger in glass guarantees that neither noticeable attrition of the material nor a disturbing catalytic influence of the surface is to be expected. Certain surface-coated materials can be regarded as non-iron base materials, i.e. those which respond to the difference in oxidation potentials with regard to metal dusting. According to this invention, the throughput and/or the reduction potential of the reduction gas can be regulated by means of the gas sensors. This feature of the invention is a great advantage for optimization. The described reduction gas analysis and the gas sensors allow the adjustment of reduction gas temperature and reduction gas composition, i.e. its reduction potential, as desired.

BRIEF DESCRIPTION OF THE DRAWING

The invention is elaborated in the drawing which more precisely depicts the schematic process flow according to a preferred embodiment of the present invention.

DESCRIPTION OF THE PREFERRED EMBODIMENTS

Figure 1:
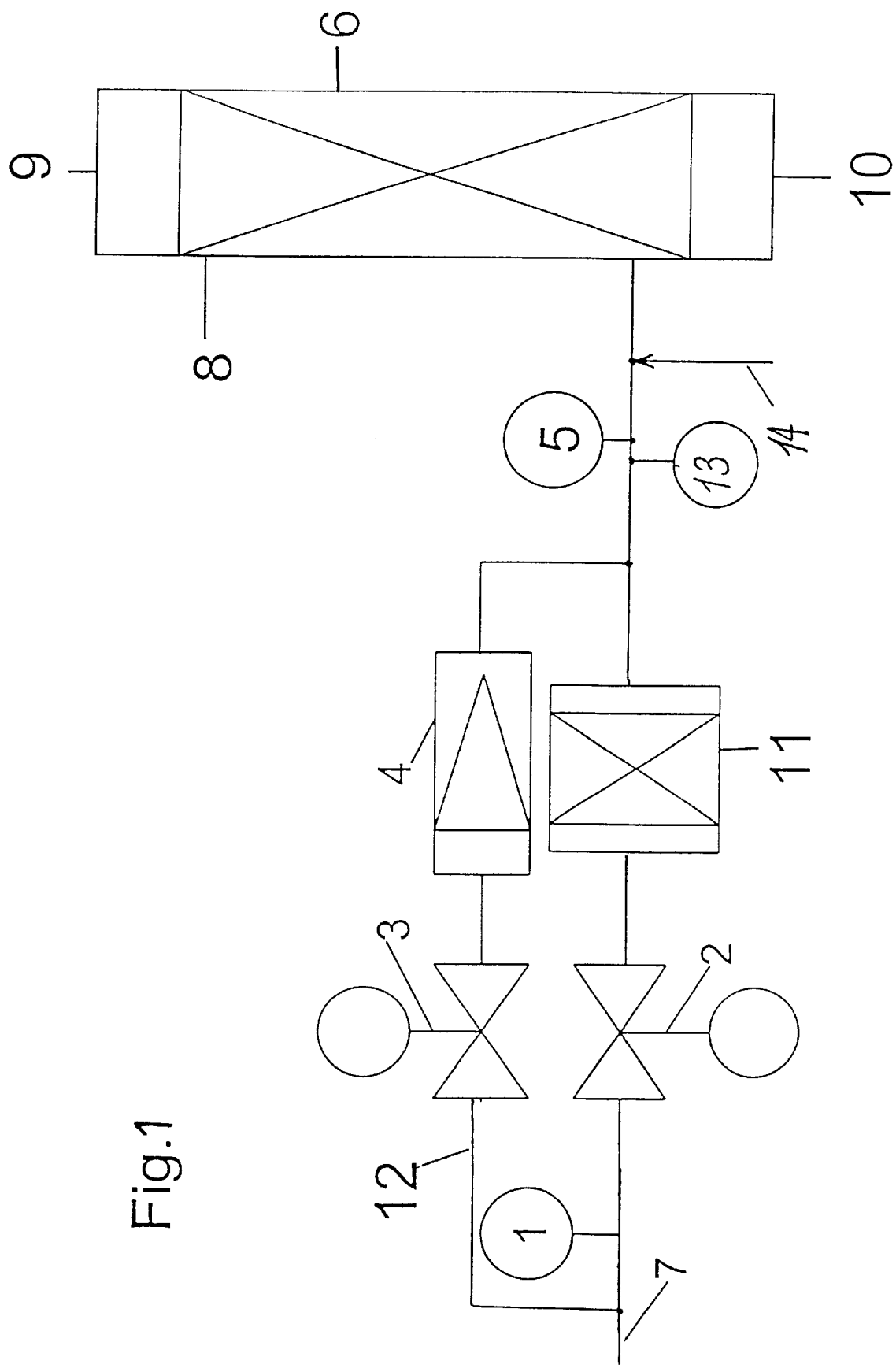

The reduction gas flowing through feed line 7 is analyzed by means of the gas sensor 1 and is divided into two partial flows (Fig.). The throughput of the first partial flow which is oxidized is regulated by means of a regulation valve 3 and then reaches the burner 4 where it is oxidized. The second partial flow of the reduction gas is regulated by means of a regulation valve 2 according to the required amount of gas in the reduction container 6 and is then brought to the required temperature in the heat exchanger 11 and mixed with the oxidized partial flow of the reduction gas. By means of the gas sensor 13, the gas components are determined and, when necessary, the addition of gas via feed line 14 is adjusted according to mathematical formulations. The pressure loss in the first partial flow is compensated for according to the pressure in the second partial flow.

The temperature is measured by a gas sensor 5 and the control circuit consisting of gas sensor 5 and regulation valve 3 is accordingly adjusted. The reduction gas is then delivered to the reduction container 6. Spent reduction gas 8 exits the reduction container 6 at its top. The ore 9 is brought into close contact with the optimized reduction gas in the reduction container 6 and is withdrawn as reacted ore 10 or sponge iron.

Optionally, the gas sensor 13 can be placed downstream of the gas feed line 14, in which case the gas feed through line 14 is adjusted on the basis of the measured composition.

What is claimed is:

1. Process for reducing metalliferous ore wherein the ore is brought into contact with a processed reduction gas at an elevated temperature, comprising:

separating a supply of reduction gas to form a first partial flow and a second partial flow thereof; and thereafter oxidizing the first partial flow;

compensating for pressure loss in the first partial flow according to the pressure of the second partial flow;

adjusting the temperature and/or pressure of the second partial flow if the conditions of the second partial flow so warrant; and thereafter rejoining the first and second partial flows; and bringing the rejoined partial flow into contact with the ore to be reduced, wherein the reduction potential of the reduction gas is adjustable by the oxidation of the first partial flow and by the control of the temperature of the reduction gas.

2. Process as claimed in claim 1, wherein the mass flow of the partial flows or of the gas addition, respectively, is regulated in the range of 0–100%.

3. The process of claim 1, wherein the reduction potential of the reduction gas is further adjustable by selective addition of a gas to the rejoined partial flows.

4. The process of claim 3, further comprising the compensating for pressure loss in the first partial flow comprises sensing the gas before the separating of the reduction gas and also sensing the gas after the rejoining of the partial flows, and adjusting the flow rates of the partial flows by the addition of a gas to the rejoined partial flows.

* * * * *